US005096633A

United States Patent [19]

Yoshida

[11] Patent Number: 5,096,633

[45] Date of Patent: Mar. 17, 1992

[54] PROCESS OF MAKING A DIAPHRAGM OF CARBONACEOUS MATERIAL

[75] Inventor: Mitsuru Yoshida, Fujioka, Japan

[73] Assignee: Mitsubishi Pencil Co., Ltd., Tokyo, Japan

[21] Appl. No.: 594,665

[22] Filed: Oct. 9, 1990

Related U.S. Application Data

[63] Continuation of Ser. No. 354,235, May 19, 1989, abandoned.

[51] Int. Cl.[5] ........................ C01B 31/02; C01B 31/04

[52] U.S. Cl. .................................... 261/29.6; 264/349; 423/448; 423/449; 523/351; 524/398; 524/435; 524/496; 524/783; 524/847

[58] Field of Search .................... 264/29.1, 29.5, 29.6, 264/29.7, 349; 423/445, 448, 449; 523/351; 524/398, 435, 495, 496, 783, 847

[56] References Cited

FOREIGN PATENT DOCUMENTS 59-164674 9/1984 Japan .................................. 423/448

*Primary Examiner*—Leo B. Tentoni

*Attorney, Agent, or Firm*—Oliff & Berridge

[57] ABSTRACT

A process for producing a diaphragm for a speaker of fully carbonaceous materials which has the steps of mixing carbon powder in an organic binder carbonized after calcining, kneading the composition to uniformly mix and disperse, preliminarily molding it in a sheet shape, molding the preliminarily molded material in a diaphragm shape, insolubilizing, infusibilizing the mixture and calcining the mixture in an inert atmosphere, wherein the composition contains a titanate coupling agent. Thus, a rigid bonding strength is provided in the boundary between the organic binder and the carbon powder in the green state of the composition, and the mixture is calcined to industrially simply and inexpensively produce a diaphragm having a high hardness, a high elasticity, a high strength, a light weight, an adequately large internal loss (and thus less deformation by an external force) small distortion of sound, wide reproducing sound range, distinct sound quality and adapted for a digital audio. The process allows the mixing of a large quantity of carbon powder to perform excellent characteristics of the carbon powder by a composite rule.

12 Claims, No Drawings

PROCESS OF MAKING A DIAPHRAGM OF CARBONACEOUS MATERIAL

This is a continuation of application Ser. No. 07/354,235 filed May 19, 1989 now abandoned.

BACKGROUND OF THE INVENTION

The present invention relates to a process for producing a diaphragm for a speaker of fully carbonaceous materials. More particularly, the invention relates to a process for producing a diaphragm for a speaker of fully carbonaceous materials having a high hardness, a high elasticity, a high strength, a light weight and a suitable internal loss as compared with conventional diaphragms, less deformation by external forces, small distortion of sound, wide reproducing sound range, distinct sound quality and adapted for a digital audio. The diaphragm is produced inexpensively by an industrially simple method. It is generally required that a diaphragm for a speaker satisfy the following conditions:

(1) large propagating velocity of sound, (2) adequately large internal loss of vibration, (3) large bending rigidity rate, and (4) stability against variations in atmospheric conditions (no deformation or change of properties).

More specifically, the material for the diaphragm is required to reproduce in high-fidelity over a broad frequency band. To efficiently and distinctly produce sound quality, the material should have high rigidity, a light weight, and no distortion, such as creep, from external stress. The conventional materials used are paper, plastic and metals. However, while the paper and plastic have adequately large internal loss, they have a small propagating velocity of sound and are unstable to variations in atmospheric conditions. The metals have a larger propagating velocity than paper and plastic, but are still insufficient because of extremely small internal loss of vibration.

Recently, the use of a speaker diaphragm made of carbonaceous materials has been proposed due to the excellent features of carbon materials, i.e., a light weight, a high rigidity, an adequately large internal loss, and stability against variation in the atmosphere conditions such as temperature and moisture. More specifically, plastics to be carbonized or plastics in which carbon powder is dispersed are formed in sheets. These sheets are molded in a diaphragm shape by utilizing its deformation by heating, carbonizing and calcining.

The large propagating speed of sound is important among the features of the diaphragm. It is known that preferable results are obtained with a diaphragm of carbonaceous material due to a composite rule in a composite material of carbon fiber (particularly short fiber of carbon fiber having a high elastic rate) and crystalline graphite powder or graphite whisker as blended, as compared with material carbonized solely with an organic binder.

However, the carbon powder (especially the powder having a higher elastic rate) contains a crystal structure wherein carbon elements are regularly arranged with very small surface energy, thereby resulting in less affinity with the surface of an organic binder. Accordingly, the bond between the organic binder matrix and the carbon powder is weak when formed by merely dispersing, mixing and kneading the mixture of the organic binder and the carbon powder. Consequently, large bonding strength cannot exist in the boundary between the binder carbon carbonized from the organic binder and the carbon powder in the fine structure of the diaphragm obtained by the carbonization. Thus, the conventional diaphragm cannot satisfy the composite rule or utilize the excellent characteristics of the carbon powder due to the reasons described above.

Further, it is also known that, when a filler is used in the organic binder, the flexibility and the elongation of a preliminarily molded sheet decreases due to an increase in the viscosity of the mixed composition. The resulting product exhibits less moldability than the material in which no filler is used. Therefore, there is also the disadvantage that the quantity of the filler to be added is limited.

SUMMARY OF THE INVENTION

Accordingly, an object of the present invention is to provide a process for industrially simply and inexpensively producing a diaphragm of fully carbonaceous materials having a high hardness, a high elasticity, a high strength, a light weight, an adequately large internal loss (and thus less deformation by an external force), small distortion of sound, wide reproducing sound range, distinct sound quality and adapted for a digital audio. The present invention is accomplished by mixing a large quantity of carbon powder which possesses excellent characteristics due to the composite rule, and by obtaining a chemically bonded state or a physically bonded state in the boundary between the binder carbon and the carbon powder which cannot be obtained by a conventional process.

The inventor has undertaken a study to perform the above-described object, and developed a process for producing a diaphragm for a speaker of fully carbonaceous materials. The process comprises the steps of mixing carbon powder in a carbonized organic binder, kneading the mixture so that it is uniformly mixed and dispersed, preliminarily molding it in a sheet shape, molding the preliminarily molded material into a diaphragm shape, insolubilizing, infusibilizing the mixture and calcining the mixture in an inert atmosphere, wherein the mixture composition contains a titanate coupling agent. Thus, a rigid bonding strength is provided in the boundary between the organic binder and the carbon powder in the green state of the mixture composition. The mixture is calcined as it is so as to perform the above-mentioned object.

DETAILED DESCRIPTION OF THE INVENTION

The present invention will be described in more detail.

A titanate coupling agent for use in the present invention is an organic titanate having the following structure:

$$\underbrace{(RO)_M\!-\!Ti}_{\text{inorganic phase}} \;-\; \underbrace{(-OX_1-R_2-Y)_N}_{\text{organic phase}}$$

Examples of the above organic titanate include Titacote S-181 (tetraisopropyltitanate produced by Nippon Soda Co., Ltd., Japan), and Blaneact (isopropyltriisostearyltitanate produced by Aginomoto Co., Ltd., Japan). Tetraisopropyltitanate has the chemical structure:

$Ti(O-iC_3H_7)_4$ and isopropyltriisostearyltitanate has the chemical structure:

$Ti(O-iC_3H_7)(O-iC_{18}H_{37})_3$.

Various types and derivatives of the titanate coupling agent are obtained according to the types of the functional group and the hydrocarbon group in the structural formula above-described. In the present invention, it is preferable to select the organic phase according to the type of the organic binder to be used and the inorganic phase according to the carbon powder.

The amount of titanate coupling agent added to the mixture composition is 0.1 to 5 wt.% with respect to the carbon powder and more preferably 0.5 to 2 wt.% according to the types of organic binder and the carbon powder to be used and the quality and the properties of the product to be obtained.

A process for adding the titanate coupling agent to the mixture composition of the organic binder and the carbon powder includes: an integral blending method for adding the mixture by dissolving it in a plasticizer of organic binder, process oil or solvent (in case of mixing and kneading the mixture); a dry pretreating method for dropping or spraying a necessary quantity of titanate coupling agent directly or by dissolving it in a small amount of solvent while agitating the carbon powder; and a wet pretreating method for dissolving titanate coupling agent in a large quantity of solvent, mixing it with carbon powder by agitating, and then removing by drying the solvent or using it as it is. The present invention does not particularly limit the adding methods, but one may suitably select the optimum method.

The other components of the present invention will be described in detail.

The organic binder in the present invention is selected from one or more of the group consisting of thermoplastic resins, thermosetting resins, pitches, and natural or synthetic compounds having condensate polynuclear aromatic group in a basic structure which can be carbonized in an inert atmosphere.

The carbon powders used in the present invention are fine powders of artificial graphite, natural graphite, carbon black, cokes, carbon fiber, or graphite whisker in a range of 10 to 90 wt.% of the mixture composition. Preferable results can be attained by selecting short fibers of carbon fiber having high elastic rate, crystalline graphite powder or graphite whisker depending on the desired acoustic properties of the speaker diaphragm. More preferably, the crystalline graphite powder has ideal features as a reinforcing material of a speaker diaphragm having 1020 GPa of theoretical elastic rate (an extremely higher value than other carbon powder). Platelike and flat two-dimensional extensions of the crystal state may be used preferably. The mean particle diameter size of the powder particle is 50 microns or less and more preferably 20 microns or less.

In the process of the present invention, when mixing titanate coupling agent in the mixture composition or in order to improve the mixing or kneading characteristics of organic binder and carbon powder, the sheeting characteristics of preliminary molding, and the molding characteristics of a diaphragm shape, one or more plasticizers (such as DOP, DBP, TCP, DOA, DOS, DAP, propylene carbonate, N-methylpyrrolidone) and/or solvent, and/or one or more of molding assistants (such as chlorinated polyolefin, ethylene-vinyl acetate copolymer, ethylene-acrylic copolymer, metallic soap, fatty soap, natural wax, petroleum wax, etc.) may be added in very small amounts, as required.

An embodiment of a process for producing a diaphragm for a speaker of fully carbonaceous materials with the materials described above according to the present invention will be described in detail.

First, organic binder, carbon powder, and plasticizer and/or solvent to be added as required, and/or molding assistant, and a carbonization regulator are measured, and the mixture is uniformly dispersed and mixed by a mixer by means of a process with a titanate coupling agent according to any of the processes described above.

Then, the resultant mixture is kneaded. More preferably, in order to produce a rigid chemical bond or physical bond with the organic binder and the carbon powder in the mixture composition through the titanate coupling agent, a kneader which can add high shearing force is employed. As a result, the kneaded mixture in which the binder is carbonized after calcining is chemically and physically bonded to the surface of the carbon powder by means of a mechanochemical reaction resulting from the mechanical energy provided. Particularly, when the carbon powder in which the surface is relatively stable and inactive (as compared with other fillers) is employed, the surface formed due to the frictional pulverization or cleavage of the powder particles by means of the high shearing force is very active with very large bonding strength with which the titanate coupling agent is effective. When carbon fiber is used as the carbon powder, it is noted that the fiber may not be cut excessively. The kneader for applying the high shearing force includes a two or three roll machine, a pressure kneader, a BANBURY mixer, a biaxial screw extruder or a ball mill, etc.

Then, the kneaded mixture is sheeted in a uniform thickness by means of rolls, an extrusion molding machine with a T die disposed at the end thereof or other film forming machine.

Subsequently, the sheet is mounted in a die in which a contraction after carbonization is read out in a diaphragm shape to be obtained, and shaped into a desired diaphragm shape by means of a vacuum shaping method, a compression shaping method or a blow molding method known per se.

Then, the green molding is infusibilized and insolubilized. The infusibilizing and insolubilizing steps include, in the case of producing an ordinary carbon material, a process for heat treating at 150° to 400° C. in an oxidative atmosphere, such as air or ozone, a process for heat treating at 50° to 400° C. in corrosive gas atmosphere, such as ammonia gas or chlorine gas, and a process for irradiating by radioactive rays. In the process of the present invention, the infusibilizing and insolubilizing steps are not particularly limited. The infusibilizing and insolubilizing steps may be omitted according to the type of the organic binder to be used.

Successively, the molding treated as described above is gradually heated from room temperature in an inert atmosphere, such as nitrogen or argon gas, heated to 700° or higher and more preferably 1000° C. or higher to be carbonized, then cooled, and removed as a product.

The diaphragm for a speaker thus obtained according to the process of the present invention has the following excellent features:

(1) The organic binder and the carbon powder filler matrix are chemically and physically bonded therebetween through the titanate coupling agent in the green state to provide large bonding strength in the boundary between the binder carbon carbonized from the organic binder and the carbon powder in the fine structure of the diaphragm obtained by the carbonization. Thus, a composite rule is satisfied to utilize the excellent characteristics of the carbon powder.

(2) The viscosity of the mixture composition is reduced by the action of the titanate coupling agent. As a result, the following improvements are provided:

(a) Since the ratio of the carbon powder in the mixture composition can be increased as compared with the prior art, the characteristics of the diaphragm are improved.

(b) Even if the ratio of the carbon powder is the same as the prior art, the degree of freedom of the moldability is increased to obtain more complicated shapes or deeply drawn diaphragms.

(c) Even if the ratio of the carbon powder is the same as the prior art, the quantity of the plasticizer and the solvent to be added as required to provide plasticity of the mixture composition can be reduced. This advantageously acts in the infusibilizing and insolubilizing steps to be executed before calcining to save energy and cost.

DESCRIPTION OF THE PREFERRED EMBODIMENTS

The present invention will be described by examples of a process for producing a diaphragm of fully carbonaceous materials for a speaker, but the present invention is not limited to the particular examples.

EXAMPLE 1

A solution that is 0.5 part by weight of acylating titanate coupling agent (Titacote S-181,tetraisopropyltitanate produced by Nippon Soda Co., Ltd., Japan) was dissolved in 10 parts by weight of DBP and added dropwise while dispersing the mixture composed of 40 parts by weight of chlorinated vinyl chloride resin having 65 wt.% of chlorination degree (Nikatemp T-742 produced by Nippon Carbide Kogyo K.K., Japan), 60 parts by weight of natural flaky graphite powder (CSP produced by Nippon Graphite Kogyo K.K., Japan) and 1 part by weight of stearic acid amide in a Henschel mixer. The mixture was further dispersed and mixed for 10 min., then kneaded under a heating condition by a pressure kneader, and further sufficiently kneaded by means of a three roll machine. Then, the kneaded mixture was removed, and preliminarily molded in a sheet having 150 microns of thickness by milling rolls. Thereafter, the sheet thus provided was molded in a dome shape having 36 mm of diameter in a vacuum molding machine in which heated metal mold was mounted. Thereafter, the molding was separated from the metal mold, charged in a heating oven heated at 200° C. to be insolubilized and infusibilized, gradually heated to 1000° C. from room temperature in nitrogen gas atmosphere to be carbonized, then cooled and the product was then removed.

The thus obtained diaphragm for a speaker of fully carbonaceous materials has accurately maintained a dome shape having 90 microns of thickness and 35 mm of diameter, and has exhibited the characteristics of 1.65 of specific weight, 280 GPa of Young's modulus, 13 km/sec. of sound velocity, and 0.03 of internal loss.

EXAMPLE 2

A solution that is 0.5 part by weight of monoalkoxy titanate coupling agent (Blaneact TTS, isopropyltriisotearyltitanate produced by Ajinomoto Co., Ltd., Japan) was dissolved in 5 parts by weight of IPA and added dropwise while dispersing the carbon powder having 25 parts by weight of natural flaky graphite powder (CSP produced by Nippon Graphite Kogyo K.K., Japan) and 5 parts by weight of PAN carbon short fiber (Toraka chopped fiber TOO8A produced by Toray Industries, Inc., Japan) in a Henschel mixer, further dispersed and mixed for 10 min., and then the IPA was volatilized. 70 parts by weight of furan resin (Hitafuran VF-302 produced by Hitachi Chemical Co., Ltd., Japan) was added thereto, kneaded at room temperature for 40 min. in a Warner mixer, and then kneaded in a three roll machine for ink which is cooled with water. Then, the kneaded mixture was removed, 4 parts by weight of 50 wt.% p-toluene sulfonic acid methanol solution was added thereto, reduced under pressure, and defoamed while sufficiently agitating the mixture at room temperature in a high speed homogeneous mixer. Subsequently, the mixture was sheeted to 150 microns of thickness on a back sheet by a coating machine in which a drying zone was mounted with air heating. Then, the sheet thus obtained was separated from the back sheet, and molded in a dome shape having 40 mm diameter by means of a vacuum molding machine in which heated metal mold was mounted. Thereafter, the molding was separated from the metal mold, charged in a heating oven heated at 200° C. to be insolubilized and infusibilized, then gradually heated from room temperature to 1000° C. in a nitrogen gas atmosphere to be carbonized, then cooled and the product was then removed.

The diaphragm thus obtained for a speaker of fully carbonaceous materials has accurately maintained a dome shape having 90 microns of thickness and 35 mm of diameter, and exhibited the characteristics of 1.50 of specific weight, 120 GPa of Young's modulus and 8.9 km/sec. of sound velocity and 0.01 of internal loss.

COMPARISON EXAMPLE 1

The same mixture composition as that of the Example 1 except the titanate coupling agent was removed and the mixture was molded under the same conditions as those in the Example 1. The result was, since the flexibility and the elongation of the sheet were smaller, the top head of the stepwise dome molded was cracked, and the product could not be obtained.

Then, the mixture ratio of the organic binder and the carbon powder was altered, i.e., the sheet to be molded was adjusted by 50 parts by weight of chlorinated vinyl chloride resin and 50 parts by weight of natural flaky graphite powder, molded, and a product was then obtained. Then, a diaphragm was obtained under the same conditions as those in the Example 1.

The obtained diaphragm for a speaker of fully carbonaceous materials was accurately maintained in a dome shape having 90 microns of thickness and 35 mm of diameter, but exhibited 1.65 of specific weight, 100 GPa of Young's modulus, 7.8 km/sec. of sound velocity, and 0.03 of internal loss, which were deteriorated as compared with those in the Example 1.

COMPARISON OF EXAMPLE 2

The same mixture composition as that of the Example 2 except the titanate coupling agent was removed and the mixture was molded under the same conditions as those in the Example 2. The result was, since the flexibility and the elongation of the sheet were smaller, the top head of the stepwise dome molded was cracked, and the product could not be obtained.

Then, the mixture ratio of the organic binder and the carbon powder was altered, i.e., the sheet to be molded was adjusted by 3 parts by weight of furan resin, 12 parts by weight of natural flaky graphite powder and 3 parts by weight of PAN carbon short fiber, molded, and a product was then obtained. Then, a diaphragm was obtained under the same conditions as those in the Example 2.

The obtained diaphragm for a speaker of fully carbonaceous materials was accurately maintained in a dome shape 90 microns of thickness and 35 mm of diameter, but exhibited 1.50 of specific weight, 70 GPa of Young's modulus, 6.8 km/sec. of sound velocity, and 0.01 of internal loss, which were deteriorated as compared with those in the Example 2.

As exhibited in the Examples described above, the process according to the present invention has enabled the diaphragm for a speaker of fully carbonaceous materials to be produced by chemically and physically bonding between the organic binder and the carbon powder filler of matrix in the green state through the titanate coupling agent (which is different from the prior art process). The process results in a large bonding strength in the boundary between the binder carbon carbonized from the organic binder and the carbon powder in the fine structure of the diaphragm, thereby satisfying the composite rule, increasing the mixture ratio of the carbon powder to utilize excellent characteristics of the carbon powder.

Therefore, the diaphragm obtained according to the process of the present invention has excellent properties as a diaphragm, i.e., high hardness, high elasticity, high strength, light weight, less deformation by external force due to adequate internal loss, small distortion of sound, a wide reproducing sound range, a distinct sound quality and adapted for digital audio. In addition, the process according to the invention is industrially simple, and advantageous for inexpensively producing the diaphragm having excellent properties as described above.

What is claimed is:

1. A process for producing a diaphragm of fully carbonaceous materials for a speaker comprising the steps of:

mixing carbon powder in an organic binder which can be carbonized by calcining, and adding a titanate coupling agent to obtain a mixture, kneading the mixture to uniformly mix and disperse the mixture, preliminarily molding the kneaded mixture in a sheet shape, molding the preliminarily molded material in a diaphragm shape, insolubilizing, infusibilizing the diaphragm shape the then calcining said diaphragm shape in an inert atmosphere.

2. The process according to claim 1, wherein the amount of the titanate coupling agent added to the mixture composition is 0.1 to 5 wt% with respect to the carbon powder.

3. The process according to claim 1, wherein the titanate coupling agent is added to the mixture of the organic binder and the carbon powder by an integral blending method for adding the mixture by dissolving the titanate coupling agent in a plasticizer of organic binder, process oil or solvent while mixing and kneading the mixture.

4. The process according to claim 1, wherein said organic binder is at least one selected from the group consisting of thermoplastic resins, thermosetting resins, pitches, and compounds having condensate polynuclear aromatic group in a basic structure which can be carbonized in an inert atmosphere.

5. The process according to claim 1, wherein said carbon powder is at least one selected from the group consisting of a fine powder of artificial graphite, natural graphite, carbon black, cokes, carbon fiber, and graphite whisker in a range of 10 to 90 wt.% of the mixture composition.

6. The process according to claim 1, wherein the mean particle diameter of the powder particle is not more than 50 microns.

7. The process according to claim 1, wherein at least one substance selected from the group consisting of plasticizers, and assistants, is added to the mixture in very small amounts, as required to improve the mixing or kneading characteristics of the organic binder and carbon powder, the sheeting characteristics of preliminary molding and the molding characteristics of the diaphragm shape.

8. The process of claim 1, wherein the titanate coupling agent is added by a dry pretreating method for dropping or spraying a necessary quantity of the agent directly or by dissolving the agent in a small amount of solvent while agitating the carbon powder mixture.

9. The process of claim 1, wherein the titanate coupling agent is added by a wet pretreating method wherein the agent is dissolved in a large quantity of solvent, mixed by agitating the agent with the carbon powder, then optionally removing the solvent by drying.

10. The process of claim 7, wherein the plasticizers are selected from the group consisting of DOP, DBP, TCP, DOA, DOS, DAP, propylene carbonate, N-methylpyrrolidone and solvents.

11. The process of claim 7, wherein the molding assistants are selected from the group consisting of chlorinated polyolefin, ethylene-vinyl acetate copolymer, ethylene-acrylic copolymer, metallic soap, fatty soap, natural wax and petroleum wax.

12. The process of claim 7, wherein the titanate coupling agent is selected from the group consisting of tetraisopropyltitanate and isopropyltriisostearyltitanate.

* * * * *